United States Patent [19]
Peres et al.

[11] Patent Number: 5,917,427
[45] Date of Patent: Jun. 29, 1999

[54] DIGITAL SWITCH ARRAY

[75] Inventors: Mauricio Peres, Kanata; Hojjat Salemi, Nepean, both of Canada

[73] Assignee: Mitel Corporation, Kanata, Canada

[21] Appl. No.: 08/879,785

[22] Filed: Jun. 20, 1997

[30] Foreign Application Priority Data

Jun. 26, 1996 [CA] Canada ................................... 2179943

[51] Int. Cl.$^6$ ................................................ H04Q 11/04
[52] U.S. Cl. .................................. 340/825.8; 340/825.03; 340/826; 340/875.79; 340/825.85; 340/825.86; 340/825.87; 340/825.88; 340/825.89; 370/363; 370/369; 370/376; 370/378
[58] Field of Search ........................... 340/825.8, 825.03, 340/826, 825.79, 825.85, 825.86, 825.87, 825.88, 825.89; 370/363, 369, 371, 375, 376, 378, 379, 382, 383

[56] References Cited

U.S. PATENT DOCUMENTS

| | | | |
|---|---|---|---|
| 4,545,053 | 10/1985 | Raamot | 370/369 |
| 4,674,083 | 6/1987 | Rackin | 370/363 |
| 5,327,421 | 7/1994 | Hiller et al. | 370/369 |

*Primary Examiner*—Michael Horabik.
*Assistant Examiner*—Yves Dalencourt

*Attorney, Agent, or Firm*—Marks & Clerk

[57] ABSTRACT

A digital switch array, includes a serial input bus providing a plurality of input streams, each defining a plurality of time division multiplexed input channels, a serial output bus providing a plurality of output streams, each defining a plurality of time division multiplexed output channels, and an array of digital switches arranged in rows and columns. Each row is connected to a respective group of input streams and each column is connected to a respective group of output streams. The digital switches are capable of performing timeslot interchange between any input and any output channel. Each digital switch includes an enabling device for each output timeslot so that when the enabling device is enabled the associated output timeslot is driven, and at least first and second enabling inputs which when simultaneously activated cause the enabling device to become enabled. An array of activation lines are arranged in rows and columns. The respective rows of activation lines are connected to the first enabling inputs of each row of the digital switches and the respective columns of activation lines are connected to the second enabling inputs of each column of the digital switches. A selected row and column of the activation lines can be simultaneously activated so that the enabling device of the digital switch whose first input is connected to the activated row and whose second input is connected to the activated column becomes enabled.

9 Claims, 1 Drawing Sheet

DIGITAL SWITCH ARRAY

BACKGROUND OF THE INVENTION

This invention relates to the field of telephone switching, and more particularly to a digital switch array of the type used, for example, in PABXs (Private Automated Branch Exchanges).

Digital switches such as the Mitel DX-8980 or LDX-90820 are used in PABXs. Such switches are used to switch channels between time slots on input and output ST-buses, typically making up the rows and columns of the array respectively.

An ST-Bus is a high speed synchronous serial bus. The ST-Bus signals include a Frame Pulse (FP), a Clock (CK), and input and output ST streams. Depending on the application, the aggregate rate of the ST-Bus can be 2.048, 4.096, or 8.192 M bit/sec. Each stream is divided into frames, each frame having a period of 125 $\mu$s, for a frame rate of 8000 frames/sec (8 KHz). The start of each frame is indicated by the framing signal FP. Each frame is divided into an integer number of bit periods, with bit timing provided by the clock signal (CK).

A DS (digital switch) chip will typically switch 256 channels or 8 ST-bus streams. In order to increase the number of channels, the chips are arranged in an array with the input streams divided amongst the rows and the output streams divided amongst the columns. For example, a 2×2 array will switch 512 channels with 8 ST-bus input streams to each row and 8 ST-bus output streams to each column. Such a Ds chip is described in detail in the Mitel Corporation Digital communication Handbook.

Each chip is addressable and contains a connection memory which is written to by a controlling microprocessor through a data input. For example, if it is desired to connect channel 7 on input stream 3, which is associated with the first row of DS chips to channel 4 on output stream 12, which is associated with the second column of chips, the control microprocessor must address the chip in position (2,2) and write to the appropriate location in the connection memory. However, it must first clear the memory location for channel 4, stream 12 in the chip in position (1,2) to prevent two chips from trying to drive the same output timeslot on the same stream and thereby corrupt the data. Thus, setting up a connection involves at least two operations, clearing the memory location in the chip in the same row that will not set up the connection, and subsequently writing to the memory location in the active chip.

This mechanism thus guarantees that only one DS chip drives a particular time slot within a column. Each DS chip contains a connection memory, which includes a separate location for each output channel. For every output channel in the connection memory, each DS chip contains an enable bit for each output timeslot that is used to enable that DS to drive a particular output timeslot. This bit is disabled (output is in high-impedance state) when the DS is not required to drive that particular time slot. The microprocessor thus programs all DS chips and makes sure that there is no conflict, that is, only one DS within a column drives a particular output timeslot. The microprocessor must maintain a memory map of which switch is active for each channel.

A further problem with this prior art approach is that a software problem (i.e. software bug or abnormal behaviour when a fault occurs), can create a situation where two or more DS chips within a column attempt to drive a particular output timeslot. This situation corrupts the data on that particular channel, increases the power dissipation of the device, and also reduces the reliability of the DS chips. This problem is hard to detect and may become the cause of a silent failure.

Another problem occurs on start-up. All DS connection memory locations are written to by the control microprocessor and all output time slots are disabled (high-impedance state). Assuming the ST-Bus streams operate at 2.048 Mbps, this requires M * N * 32 software write operations. If the ST-Bus streams operate at 8.192 Mbps, M * N * 128 software write operations are needed, where M is the number of rows and N is the number of columns.

There is also a need for a monitor software program that constantly checks the connection memory and makes sure that only one DS within a column is enabled to drive a particular output timeslot.

The current approach is slow and requires software overhead to check the integrity of the program within the DS.

On object of this invention is alleviate the aforementioned problems of the prior art.

SUMMARY OF THE INVENTION

According to the present invention there is provided a digital switch array, comprising a serial input bus providing a plurality of input streams, each defining a plurality of time division multiplexed input channels; a serial output bus providing a plurality of output streams, each defining a plurality of time division multiplexed output channels; and an array of digital switches arranged in rows and columns, each row being connected to a respective group of input streams and each column being connected to a respective group of output streams, said digital switches being capable of performing timeslot interchange between any input and any output channel, and each digital switch including enabling means for each output timeslot so that when said enabling means is enabled the associated output timeslot is driven, and at least first and second enabling inputs which when simultaneously activated cause said enabling means to become enabled; an array of activation lines arranged in rows and columns, the respective rows of activation lines being connected to the first enabling inputs of each row of said digital switches and the respective columns of activation lines being connected to the second enabling inputs of each column of said digital switches; and means for simultaneously activating a selected row and column of said activation lines so that the enabling means of the digital switch whose first input is connected to the activated row and whose second input is connected to the activated column becomes enabled.

The invention thus provides a hardware solution which guarantees that only one DS within a column drives a particular output timeslot because only the DS switch with both inputs activated can become enabled for the output timeslot. All other switches are disabled. This is ensured even under abnormal software behaviour.

For convenience in accordance with convention, the array has been described with the input streams constituting the rows and the output streams constituting the columns, but it will be recognized by one skilled in the art these roles could be easily reversed.

The inventive arrangement requires only one write cycle to program a new connection. The software does not require knowledge of previous connection. There is no need to disable the previous connection first.

The control of the output buffers is now dependent on an exclusive hardware combination and as only one DS chip can be enabled at a time, it is impossible to cause contention.

Furthermore, there is no need for monitor software to check that only one DS chip is driving a particular time slot within a column.

The invention also provides a method of enabling a digital switch for a particular output timeslot comprising activating a selected row and column of its activation lines so that an enabling means of the digital switch whose first input is connected to the activated row and whose second input is connected to the activated column becomes enabled for the addressed output timeslot.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
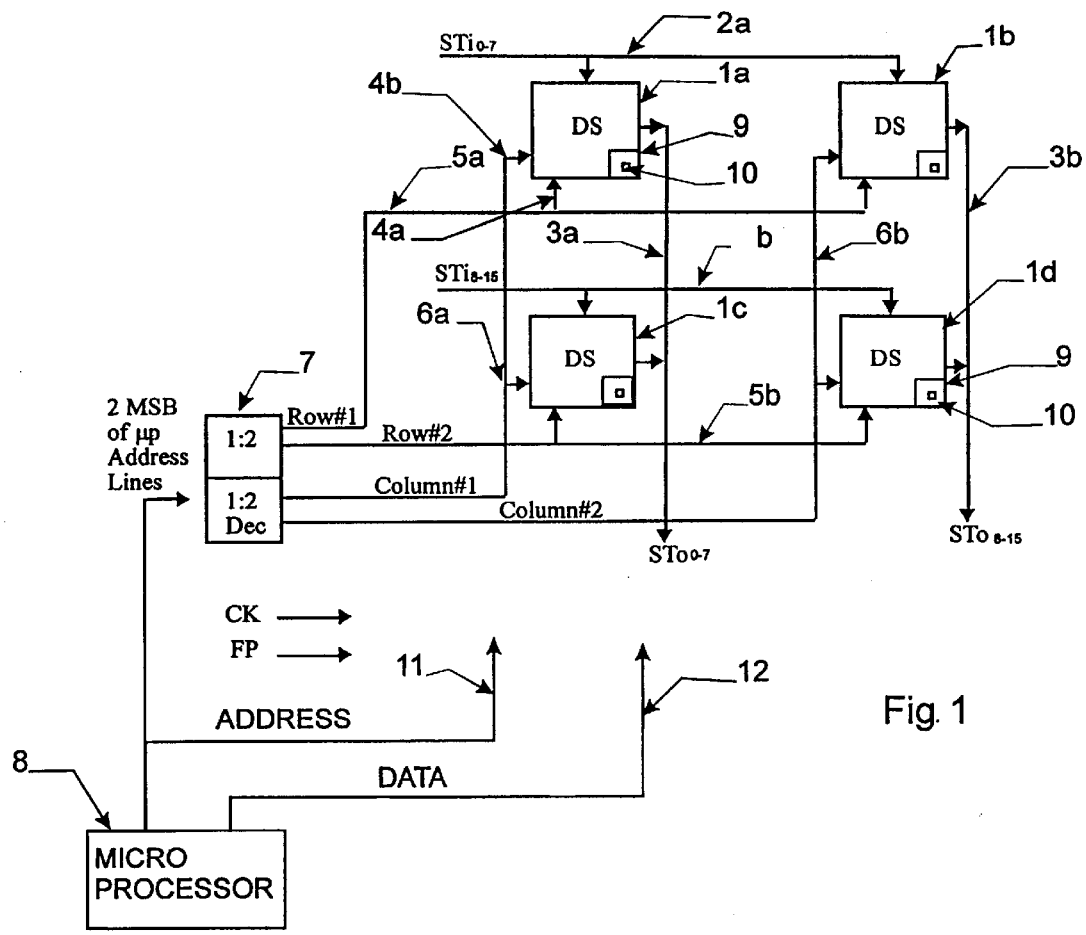
FIG. 1 is an example of a 2×2 switch array in accordance with the invention.
Figure 2:
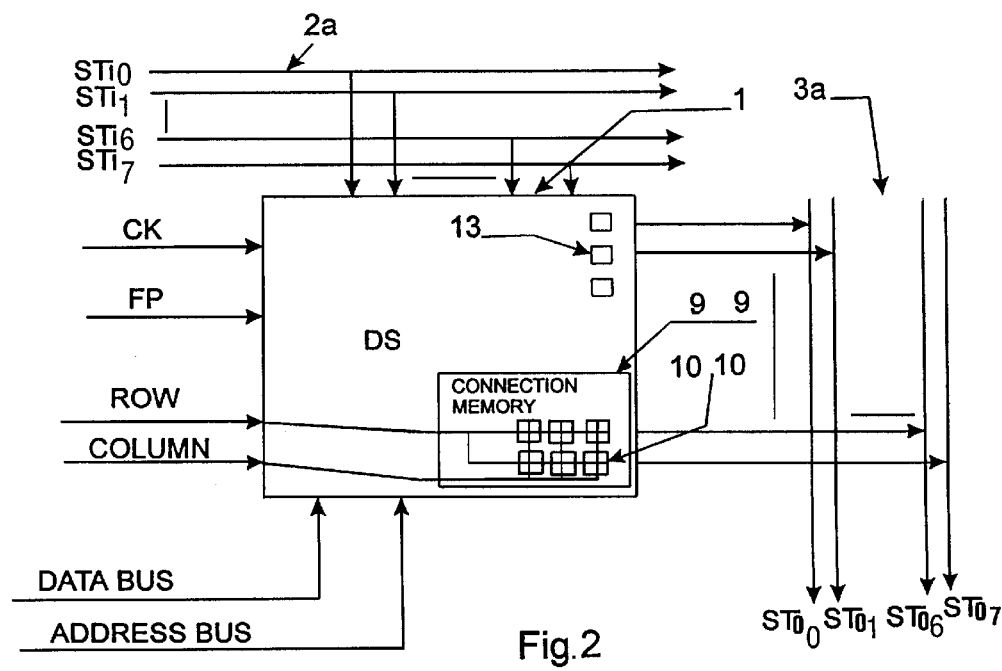
FIG. 2 shows a single chip in more detail.

Referring to the Figure, a 2×2 array of DS switches 1, such the Mitel DX-8980 or LDX-90820 switches, is shown for the sake of simplicity. In practice, there would be more switches in the array. Also, only connections which are relevant within the context of the invention are shown.

The four DS switches 1a, 1b, 1c, 1d are connected to groups of serial bus input streams 2a, 2b, with each row of switches 1 being connected to the same group of serial bus streams. Similarly the outputs of each column of DS switches are connected to the same groups of serial bus output streams 3a, 3b. In the case of a switch capable of switching 512 connections (16 ST-bus streams), input streams 0–7 would be connected to the DS switches 1a, 1b of the first row and streams 8–15 would be connected to the switches 1c, 1d of the second row. Similarly, output streams 0–7 would be connected to switches 1a, 1c of the first column and output streams 8–15 would be connected to switches 1b, 1d of the second column.

The array is therefore capable of switching between a timeslot on any particular input stream connected to its input side and a timeslot on any particular output stream connected to its output side. In order to make a particular connection, for example from timeslot or channel 23 on an input stream of group 2b to output timeslot 17 on an output stream of group 3b it is necessary to select the DS switch, 1d, in this case that is connected to both streams and enable this switch to drive timeslot 17 on output stream 3b. The other switch 1b connected to output stream 3b must be disabled to prevent the corruption of data in the ST-bus frame when output timeslot 17 is driven.

This is done by control microprocessor 8, which has an address bus 11 and a data bus 12.

The DS switches include a connection memory 9 which keeps track of the connections between the input and output channels. The connection memory locations are used to define the source channel for a particular output timeslot. The connection memory 9 contains an enable bit in a memory cell 10 for each output timeslot which is used to enable that switch to drive that particular output timeslot. As an example, if 512 output timeslots are present, 512 bits are necessary. Each output channel is associated with a buffer 13 controlled by the enable bit in the connection memory 9 to activate or de-activate the associated output timeslot when its turn in the ST-bus frames comes round. This ensures that a particular output timeslot will be driven by only one DS switch.

In the prior art, the microprocessor 8 would need to keep track of which switch previously drove a particular output time slot and address the corresponding location in its connection memory to disable it before it could enable that output timeslot in the current chip.

In accordance with the invention, instead of the enable bit in the connection memory being activated via software under microprocessor control, each DS switch 1a, 1b, 1c, 1d is provided with a pair of hardware addressable pins, which when both activated for a particular address enable the enable bit in the connection memory for the associated output timeslot. Unless both pins are active, the addressed location is disabled.

One pin 4a of each pair corresponds to a row input and the other pin 4b corresponds to a column input. In order to enable a particular switch to drive a particular time slot, say switch 1bthe control microprocessor merely needs to address the corresponding locations of all the connection memories simultaneously and activate the rows and columns that both connect to that switch 1bin this case row 5a and column 6b.

During the write cycle, all the connection memories will contain the same source channel data, but only one is activated by the hardware enable bits and the others are automatically disabled. It is much more efficient to write to all the connection memories simultaneously so that they all contain the same data rather than address each one separately as was necessary in the prior art.

In order to address the hardware enable inputs of the switches, some of the address lines are dedicated for this purpose. In the case of a 2×2 array, where there are two rows and two columns, two address lines. The rows 5a, 5b and columns 6a, 6bare connected to the 1:2 decoder 7, which decodes, for example, the two Most Significant Bits (MSB) of the address lines of the control microprocessor 8.

The MSB of microprocessor address lines are thus used to select one column and one row of the DS array. In this case, if MSB is "0" Row 5a is HIGH otherwise Row 5b is HIGH. The number of microprocessor address lines needed is $Log_2M+Log_2N$. For a 2×2 array, two MSB of microprocessor address lines are used, whereas for an 8×8 array six MSBs of microprocessor address lines are used. Independent of the array size, the DS requires two input pins to implement this feature, one for the column input and one for the row input. Of course, if desired additional pins can be provided to permit the direct hardware control of other aspects of the DS operation.

In the present invention, each enable/disable in the connection memory is under hardware control and appears as Read Only to control software.

To program a output timeslot, the controlling microprocessor addresses the corresponding memory location in all the switches over address lines 11 and writes the appropriate source connection data to each memory location over data bus 12. Within the same write cycle, through the two MSB of the address lines, the microprocessor 8 activates the lines corresponding to a particular column and row. The DS switch that has both the column and row lines activated enables the output for that time slot, and all other DS within that activated column disable the output for that time slot even though their connection memories contain the same connection data, which in the case of all the switches except for the active one is redundant.

All other DS chips within the array would perform no function in that output timeslot. These include the DS chips which have both row and column lines not activated or only row lines activated. Only one DS within the entire array has both column and row lines activated (i.e. HIGH).

Using this method, any particular channel can be programmed in one write cycle and the previous connection is automatically disabled. The controlling microprocessor does not require any knowledge of the output enable bits of the connection memory map.

The invention can be applied to any digital switch applications where a Time Slot Interchange (TSI) function is performed. The invention is applicable, for example, to SONET/SDH cross connects.

We claim:

1. A digital switch array, comprising a serial input bus providing a plurality of input streams, each defining a plurality of time division multiplexed input channels; a serial output bus providing a plurality of output streams, each defining a plurality of time division multiplexed output channels; and an array of digital switches arranged in rows and columns, each row being connected to a respective group of input streams and each column being connected to a respective group of output streams, said digital switches being capable of performing timeslot interchange between any input and any output channel, and each digital switch including enabling means for each output timeslot so that when said enabling means is enabled the associated output timeslot is driven, and at least first and second enabling inputs which when simultaneously activated cause said enabling means to become enabled; an array of activation lines arranged in rows and columns, the respective rows of activation lines being connected to the first enabling inputs of each tow of said digital switches and the respective columns of activation lines being connected to the second enabling inputs of each column of said digital switches; and means for simultaneously activating a selected row and column of said activation lines so that the enabling means of the digital switch whose first input is connected to the activated row and whose second input is connected to the activated column becomes enabled.

2. A digital switch array as claimed in claim 1, wherein said activation lines are connected to a decoder that is addressed by a microprocessor.

3. A digital switch array as claimed in claim 2, wherein said decoder is addressed by selected microprocessor address lines dedicated of this purpose.

4. A digital switch array as claimed in claim 1 wherein said dedicated microprocessor address lines represent the most significant bits.

5. A digital switch array as claimed in claim 1, wherein said enabling means comprises a memory cell associated with each output channel in a connection memory in each said digital switch.

6. In a digital switch array, comprising a serial input bus providing a plurality of input streams, each defining a plurality of time division multiplexed input channels; a serial output bus providing a plurality of output streams, each defining a plurality of time division multiplexed output channels; and an array of digital switches arranged in rows and columns, each row being connected to a respective group of input streams and each column being connected to a respective group of output streams, said digital switches being capable of performing timeslot interchange between any input and any output channel, and each digital switch including enabling means for each output timeslot so that when said enabling means is enabled the associated output timeslot is driven, and at least first and second enabling inputs which when simultaneously activated cause said enabling means to become enabled; an array of activation lines arranged in rows and columns, the respective rows of activation lines being connected to the first enabling inputs of each row of said digital switches and the respective columns of activation lines being connected to the second enabling inputs of each column of said digital switches; a method of enabling a digital switch for a particular output timeslot comprising activating a selected row and column of said activation lines so that the enabling means of the digital switch whose first input is connected to the activated row and whose second input is connected to the activated column becomes enabled for the addressed output timeslot.

7. A method as claimed in claim 6, wherein said activation lines are addressed by a microprocessor.

8. A method as claimed in claim 7, wherein each output channel is associated with a buffer, said buffer being controlled by the enabling means to activate or deactivate the associated output timeslot.

9. A method as claimed in claim 6, wherein said input lines when simultaneously activated set an enabling bit in a connection memory in each said digital switch for the output timeslot in question.

\* \* \* \* \*